Patented Aug. 9, 1927.

1,638,421

UNITED STATES PATENT OFFICE.

ROY H. UHLINGER, OF MOUNT LEBANON TOWNSHIP, ALLEGHENY COUNTY, PENNSYLVANIA, ASSIGNOR TO THERMATOMIC CARBON COMPANY, OF PITTSBURGH, PENNSYLVANIA, A CORPORATION OF DELAWARE.

RUBBER COMPOSITION.

No Drawing.      Application filed August 8, 1925. Serial No. 49,144.

The present invention relates to a rubber composition, and more particularly to a rubber composition having incorporated therein a special carbon.

This application is a continuation in part of application, Serial No. 543,470, filed March 13, 1922.

Carbon in the form of carbon black has been extensively used for incorporation in rubber stock intended for use in the treads of vehicle tires, rubber heels, rubber soles, mechanical goods, and other articles that are subject to wear or to the likelihood of injury. The carbon serves as a filler, it improves the aging qualities, it toughens the rubber and gives it greater coherence, so that the rubber is not destroyed so rapidly by the action of air and sunlight, is less readily bruised, and there is less tendency for cuts or tears to spread.

The incorporation into the rubber of sufficient common commercial carbon black to improve satisfactorily its aging qualities and to toughen it, has resulted, however, in a marked stiffening of the rubber and in a reduction of its liveliness. The use of such carbon black, therefore, presents a distinct disadvantage when the rubber is to be put to use in certain articles, such, for example, as inner tubes and side walls of pneumatic tires and in friction stocks for belts, hose and pneumatic tires. The percentage of common commercial carbon black usually incorporated with the rubber has been, therefore, rigidly limited in rubbers employed for these purposes, the amount of such carbon black being commonly less than 10% by volume of the raw materials making up the rubber composition. Even such a relatively small amount of the common commercial carbon black adds materially to the stiffening of the rubber, so much so, in fact, that it has been found impracticable to use common commercial carbon black for the manufacture of friction stocks for belts and pneumatic tires.

Common commercial carbon black, owing to its pronounced stiffening effect in the rubber composition, may not be used to displace zinc oxide volume by volume in many articles, such, for example, as cushion and inner tube stocks for pneumatic tires or friction stocks for belts and pneumatic tires, although carbon black is much cheaper than zinc oxide. It has been found that stiff composition rubber stocks are liable to cause separation between plies or between the tread and carcass of pneumatic tires during use.

Moreover, rubber compositions containing the commercial carbon black, due to its stiffening, have a tendency to scorch during calendering and tubing operations.

Common commercial carbon black increases the length of time necessary to vulcanize the rubber composition to a technical cure. This retardation is so pronounced that certain otherwise desirable accelerators cannot be used in rubber stocks containing the common commercial carbon black.

Common commercial carbon black is usually manufactured by the channel, disk or drum processes, in which a flame of natural gas burns against the cold metal surface upon which the carbon black is deposited. Sometimes such carbon black is manufactured by burning gas in a chamber with insufficient oxygen, resulting in a smoky flame and the deposition of the carbon black.

Common commercial carbon black has certain well known physical characteristics. It is very light in weight and fluffy in the uncompressed state, and weights about 12 pounds per cubic foot, depending upon the degree to which it has been shaken down and allowed to settle. The true specific gravity of common commercial carbon black as determined by standard methods is from about 1.75 to 1.8. The shape of the particles is apparently such that they contain air or perhaps are surrounded by a film of air, which renders such carbon black very fluffy and light. Such carbon black has a jet black color with a brown or reddish brown undertone. Because of the extremely fluffy quality, the common commercial carbon black is difficult to mill into the rubber and flies around badly in the mill room and prolongs the milling operations.

Another distinguishing characteristic of common commercial carbon black is its relatively high oil absorption qualities and its high rubber stiffening qualities. Its oil absorption number as determined by the standard methods commonly employed in paint manufacture is over 150, varying from about 150 to over 400, depending upon the particular method of manufacture of such carbon black. This means that 150 to 400, or over, cubic centimeters of pale amber colored commercial raw linseed oil will be required to be mixed with 100 grams of common commercial carbon black, so that the mass may be rolled into a ball and begin to smear a clean smooth glass or porcelain surface. The oil absorbing characteristics of the carbon black are apparently directly related to and are a measure of the rubber stiffening characteristics of the carbon black. According to one theory, rubber consists of a continuous phase and a discreet phase, and the stiffening of the rubber by carbon black is attributed to its absorption of the continuous rubber phase. Such theory apparently explains why the oil absorption number of the carbon black furnishes a measure of its rubber stiffening qualities.

I have discovered that a rubber composition having the desirable qualities of improved aging, increased tensile strength, toughness and wear-resisting qualities, but without the undesirable increase in stiffness, may be produced by substituting a special finely divided carbon in place of the common commercial carbon black. The carbon which I employ is that commonly known in the trade as "Thermatomic" carbon, the word "Thermatomic" being the trademark of the Thermatomic Carbon Company, the manufacturer of this class of carbons. "Thermatomic" carbon has certain distinguishing physical characteristics which peculiarly adapt it for use in rubber compounding. It has a much lower oil absorption number than common commercial carbon black. Its oil absorption number is usually less than 100. This means that less than 100 cubic centimeters of pale amber colored commercial raw linseed oil are required to be mixed with 100 grams of the "Thermatomic" carbon, so that the mass may be rolled into a ball and will begin to smear a clean smooth glass or porcelain surface. The oil absorption number of "Thermatomic" carbon is approximately the same as that of zinc oxide. The rubber stiffening qualities of "Thermatomic" carbon are approximately the same as those of an equal volume of zinc oxide. "Thermatomic" carbon may be substituted in rubber compositions volume for volume for the common commercial zinc oxide, thus greatly reducing the cost, since the cost per unit volume of "Thermatomic" carbon is approximately 1/5 that of the zinc oxide. It is found in commercial practice that all but a relatively small portion of the zinc oxide may be replaced to advantage by an equivalent volume of "Thermatomic" carbon without causing any appreciable change in the stiffening of the rubber composition. A relatively small portion of the zinc oxide is necessary in many cases to activate certain accelerators commonly employed in rubber compounding.

The decreased stiffening qualities of "Thermatomic" carbon as compared with the common commercial carbon black particularly adapt it for use in rubber compositions for inner tubes and side walls of pneumatic tires, in friction stocks for belts and pneumatic tires, or for other purposes where the increased tensile strength, toughness, wear and age resisting qualities, combined with resiliency, are desired.

Another physical characteristic of "Thermatomic" carbon is its greater apparent weight as compared with common commercial carbon black. "Thermatomic" carbon weighs from about 25 to 35 pounds per cubic foot, depending upon the degree to which it is shaken down and allowed to settle. It is, therefore, approximately two and one-half times as heavy per unit volume as common commercial carbon black. The true specific gravity of "Thermatomic" carbon as determined by standard methods is approximately 1.8, which is substantially the same as that of the common commercial carbon black. The specific gravity is usually determined by wetting the carbon with an oil, such as kerosene oil, and noting the displacement of the oil by the carbon and then computing the specific gravity as compared with water. "Thermatomic" carbon is also much less fluffy than common commercial carbon black. This is apparently due to the fact that "Thermatomic" carbon contains approximately only 1/5 of the amount of air in or around its particles as compared with commercial carbon black. The greater weight and less fluffiness of the "Thermatomic" carbon enables it to be more readily handled in the factory and on the compounding mills.

The shape and possibly the size of the microscopic particles of the "Thermatomic" carbon which give it greater weight per unit volume and render it less fluffy, apparently are directly related to its decreased stiffening qualities when incorporated in the rubber. "Thermatomic" carbon is extremely finely divided, the particles having a size of the same order of magnitude as those of common commercial carbon black and lamp black, which average a fraction of a micron in diameter.

The term "Thermatomic" carbon as used herein is intended as a term of general description of carbons having or approximating the physical characteristics above noted, particularly the decreased rubber stiffening qualities. The term "Thermatomic" carbon is not intended as a term of limitation to limit such carbon to that manufactured by any specific process.

The preferred and usual process of manufacturing "Thermatomic" carbon is that de-described in the patents of Brownlee and Uhlinger, No. 1,478,730 and No. 1,520,115. According to the process of said patents, a hydrocarbon gas, usually natural gas, is decomposed by passage through a highly heated retort to yield the carbon. "Thermatomic" carbon having or approximating the carbon of the "thermal" production described in Brownlee and Uhlinger patents, may be obtained by modifications of the Brownlee and Uhlinger process, or by other processes; for example, air may be bled into the stream of gas passing into the heated retort of the Brownlee and Uhlinger apparatus, resulting in a limited partial combustion of the hydrocarbon without detrimentally affecting the desirable physical qualities of the carbon black. Instead of introducing air into the gas stream passing through the heated retort, other diluent gases may be used, such, for example, as hydrogen, which will serve to reduce the concentration of the hydrocarbon gas and sweep it more rapidly through the heated zone of the retort, as described, for example, in the copending application of Ellwood B. Spear and Robert L. Moore, Serial No. 61,149, filed October 7th, 1925. The carbons made by these other processes and particularly when a diluent gas is used to reduce the concentration of the hydrocarbon gas, while having a lower weight per unit volume and a darker color than the carbons manufactured by the specific process described in the Brownlee and Uhlinger patent, nevertheless possess the desired characteristics of stiffening rubber much less than the common commercial carbon blacks and like the carbon produced by the specific process of the Brownlee and Uhlinger patent, are characterized by a low oil absorption number usually less than 100.

The "Thermatomic" carbon as made by the process of the Brownlee and Uhlinger patents has a dark gray color and a blue or violet blue undertone. These color characeristics are usually present, although perhaps in a somewhat modified degree, in "Thermatomic" carbon made by other processes, such, for example, as the above mentioned modification of the Brownlee and Uhlinger process, in which a limited amount of air or other diluent gas is bled into the hydrocarbon gas as it passes to the gas decomposing retorts.

The following four formulas show typical rubber mixes employing "Thermatomic" carbon. These formulas, while setting forth specific examples, are, of course, merely illustrative of the wide range of possible formulas for rubber compositions.

*Formula No. 1.*

| | Parts by weight. |
|---|---|
| Pale crepe rubber | 73.5 |
| "Thermatomic" carbon | 19.06 |
| Zinc oxide | 4.33 |
| Sulphur | 1.84 |
| Diphenylguanidine | 1.27 |

This forms a particularly tough stock suitable for pneumatic tire side walls, or for hose coverings.

*Formula No. 2.*

| | Parts by weight |
|---|---|
| Pale crepe rubber | 77.13 |
| "Thermatomic" carbon | 10.00 |
| Mineral rubber | 3.00 |
| Pine tar | 1.00 |
| Zinc oxide | 4.80 |
| Sulphur | 3.00 |
| Diphenylguanidine | 1.07 |

This is a tough stock, more elastic than that of the first formula, and is suitable for friction and inner tube stock for pneumatic tires, or friction and ply stocks for belts, etc.

*Formula No. 3.*

| | Parts by weight. |
|---|---|
| Pale crepe rubber | 60.2 |
| "Thermatomic" carbon | 33.66 |
| Zinc oxide | 3.58 |
| Sulphur | 1.52 |
| Diphenylguanidine | 1.04 |

This is a stiffer stock, more suitable for mechanical goods, such as rubber heels, gaskets, tubing, etc.

*Formula No. 4.*

| | Parts by weight |
|---|---|
| Pale crepe rubber | 39.00 |
| Mineral rubber | 1.66 |
| "Thermatomic" carbon | 54.44 |
| Zinc oxide | 2.32 |
| Sulphur | 2.53 |
| Diphenylguanidine | 1.05 |

This is a still stiffer stock, suitable for certain mechanical goods, such as heavy gaskets, rubber flooring, stair treads, step plates, shock absorbers, window strips, etc.

The rubber compositions containing the "Thermatomic" carbon are all characterized by having much less stiffness than rubber compositions containing an equal weight of common commercial carbon black. The stiffness of rubber as the term is ordinarily used in this art, is commonly measured by determining the load in pounds per square inch of rubber, calculated on the original cross section of the test piece, that is necessary to stretch the test piece to six times the original length of the test piece, or in other words, in terms of the load at a given elongation of the test piece. If properly cured samples of the rubber containing common commercial carbon black are subjected to comparative tests against similar samples containing an equal weight of "Thermatomic" carbon, the former will be found to be much stiffer than the latter, the stiffness being measured as defined above, or by any other method used in the art of rubber testing. For example, properly cured samples of the rubber composition compounded according to Formula No. 1, except that common commercial carbon black has been substituted for the "Thermatomic" carbon, give a stiffness as defined above of from 2400 to 3600 pounds, depending upon the quality of the carbon black and other constituents. On the other hand, the stiffness of samples of rubber composition containing "Thermatomic" carbon compounded according to Formula No. 1 above is from 1600 to 1800 pounds, depending upon the quality of the constituents.

The rubber compositions containing "Thermatomic" carbon have, in addition to the much less stiffness, the advantages of improved aging, increased tensile strength, increased toughness and wear-resisting qualities imparted to the rubber by carbon black.

Rubber compositions containing the "Thermatomic" carbon have a much lower permanent set than those containing common commercial carbon black. This is of particular advantage in the manufacture of cushion stocks, inner tubes, etc., because the finished product will retain its original shape better where the permanent set is as low was possible.

The rubber compositions containing "Thermatomic" carbon do not require so long a vulcanization time as rubber compositions containing common commercial carbon black. "Thermatomic" carbon does not retard the curing process with any of the common accelerators used in the art of rubber compounding, whereas common commercial carbon black does retard the curing. "Thermatomic" carbon may be used successfully with accelerators such as some derivatives of the dithiocarbamic acid, such as tetra-methyl-thiuram disulphide, whereas common commercial carbon black may not be so used. The time necessary to vulcanize a rubber composition at 141° C. compounded according to Formula No. 1 to a technical cure has been found to be approximately 35 minutes, whereas the time necessary to vulcanize a similar rubber composition at the same temperature, but containing an equal weight of common commercial carbon black, has been found to be approximately 45 minutes. The rubber compositions made with the "Thermatomic" carbon are much more easily and quickly handled in the factory operations than those containing common commercial carbon black. There is less tendency for the rubber composition to scorch during calendering or tubing operations.

While I have described the preferred embodiment of my invention and have given specific examples thereof, it is to be understood that the invention is not to be limited to such preferred embodiments, but may be otherwise embodied within the scope of the following claims.

I claim:

1. A rubber composition comprising a rubber stock having incorporated therein a finely divided carbon having the characteristic of stiffening the rubber much less than an equal weight of common commercial carbon black.

2. A rubber composition comprising a rubber stock having incorporated therein a finely divided carbon having rubber stiffening qualities approximating those of zinc oxide.

3. A rubber composition comprising a rubber stock having incorporated therein a finely divided carbon characterized by having a weight per unit volume as initially produced greatly in excess of that of common commercial carbon black but having a true specific gravity approximately equal thereto.

4. A rubber composition comprising a rubber stock having incorporated therein "Thermatomic" carbon.

5. A rubber composition comprising a rubber stock having incorporated therein "Thermatomic" carbon and characterized by having a stiffness much less than that of a rubber composition containing the same amount of common commercial carbon black.

6. A rubber composition comprising a rubber stock having incorporated therein a finely divided carbon having an oil absorption number of not over approximately 100, and characterized by having less stiffness than a rubber composition containing an equal weight of common commercial carbon black.

7. A rubber composition comprising a rubber stock having incorporated therein a finely divided carbon characterized by having rubber stiffening and oil absorption qualities materially less than common commercial carbon black, the rubber composition being characterized in having materially less stiffness and having greater ease in working and a shorter vulcanization time than a rubber composition containing an equal weight of common commercial carbon black.

8. A rubber composition comprising a rubber stock having incorporated therein a finely divided carbon of thermal production characterized by the fact that in mass and uncompressed a given volume of the same has an apparent weight greatly in excess of that of common commercial carbon black, such thermal carbon having a true specific gravity approximately equal to that of common commercial carbon black.

9. A rubber composition comprising a rubber stock having incorporated therein as the largest single added ingredient a finely divided carbon of thermal production characterized by the fact that in mass and uncompressed a given volume of the same has an apparent weight greatly in excess of that of common commercial carbon black but has a true specific gravity approximately equal thereto.

10. A rubber composition comprising a rubber stock having incorporated therein a quantity in excess of thirty per cent of the total composition a finely divided carbon of thermal production characterized by the fact that in mass and uncompressed a given volume of the same has an apparent weight greatly in excess of that of common commercial carbon black but has a true specific gravity approximately equal thereto.

11. The process of compounding rubber comprising the step of incorporating therein a finely divided carbon having the characteristics of stiffening the rubber much less than an equal weight of common commercial carbon black.

12. The process of compounding rubber comprising the step of incorporating therein a finely divided carbon having rubber stiffening qualities approximately those of zinc oxide.

13. The process of compounding rubber comprising the step of incorporating therein "Thermatomic" carbon.

14. A rubber composition comprising a rubber stock having incorporated therein a finely divided carbon having an oil absorption number materially less than that of common commercial carbon black, and characterized by having a stiffness much less than that of a rubber composition having the same amount of common commercial carbon black.

15. A rubber composition comprising a rubber stock having incorporated therein a finely divided carbon having rubber stiffening qualities approximately those of zinc oxide, and characterized by having a stiffness much less than that of a rubber composition containing the same amount of common commercial carbon black.

16. A rubber composition comprising a rubber stock having incorporated therein a finely divided carbon having rubber stiffening and oil absorption qualities approximating those of zinc oxide.

17. A rubber composition comprising a rubber stock having incorporated therein a finely divided carbon having rubber stiffening qualities and an oil absorption number both materially less than those of common commercial carbon black.

18. The process of compounding rubber comprising the step of incorporating therein a finely divided carbon having an oil absorption number less than 100 and rubber stiffening qualities less than those of common commercial carbon black.

19. The process of compounding rubber comprising the step of incorporating therein a finely divided carbon having rubber stiffening qualities and an oil absorption number both materially less than those of common commercial carbon black.

In testimony whereof I have hereunto set my hand.

ROY H. UHLINGER.